United States Patent [19]

Kanazawa et al.

[11] Patent Number: 5,453,972
[45] Date of Patent: Sep. 26, 1995

[54] OPTICAL DISK APPARATUS

[75] Inventors: Hiroshi Kanazawa, Hitachi; Fumio Tajima, Ibaraki; Ryoichi Naganuma; Nobuyoshi Mutoh, both of Katsuta; Tadashi Takahashi, Hitachi; Hideki Nihei, Hitachiota; Shunichi Tanae, Hitachi; Hideaki Horie, Hitachi; Syooichi Kawamata, Hitachi, all of Japan

[73] Assignee: Hitachi, Ltd., Tokyo, Japan

[21] Appl. No.: 10,019

[22] Filed: Jan. 27, 1993

[30] Foreign Application Priority Data

Jan. 30, 1992 [JP] Japan .................. 4-014700
Jan. 31, 1992 [JP] Japan .................. 4-016593

[51] Int. Cl.$^6$ .............. G11B 7/085; G11B 7/12; G11B 25/04
[52] U.S. Cl. .............. 369/219; 369/223; 369/270
[58] Field of Search .............. 369/139, 189, 369/208, 215, 219, 223, 247, 248, 270

[56] References Cited

U.S. PATENT DOCUMENTS

| Re. 32,574 | 1/1988 | Ceshkovsky et al. | 369/32 |
|---|---|---|---|
| 3,963,863 | 6/1976 | Malissin et al. | 178/6.6 R |
| 4,375,091 | 2/1983 | Dakin et al. | 369/32 |
| 4,394,667 | 7/1983 | Cheng et al. | 346/137 |
| 4,472,796 | 9/1984 | Torrington | 369/219 |
| 4,481,613 | 11/1984 | Yokota | 369/219 |
| 4,620,301 | 10/1986 | Koide | 369/266 |
| 4,855,629 | 8/1989 | Sato | 310/49 R |
| 4,932,019 | 6/1990 | Bessho | 369/247 |
| 5,063,557 | 11/1991 | Takamatsu et al. | 369/219 |
| 5,103,358 | 4/1992 | Munekata | 369/270 |
| 5,138,605 | 8/1992 | Shtipelman et al. | 369/219 |

FOREIGN PATENT DOCUMENTS

| 0266747 | 5/1986 | European Pat. Off. |
|---|---|---|
| 0348197 | 12/1989 | European Pat. Off. |
| 0463819 | 1/1992 | European Pat. Off. |
| 60-118043 | 6/1985 | Japan |
| 61-013485 | 1/1986 | Japan |
| 62-125574 | 6/1987 | Japan |
| 1-185890 | 7/1989 | Japan |

*Primary Examiner*—Robert S. Tupper
*Assistant Examiner*—David L. Ometz
*Attorney, Agent, or Firm*—Antonelli, Terry, Stout & Kraus

[57] ABSTRACT

A portable-type disk apparatus for a 3.5-inch or less optical disk implemented in a thin, light-weight and miniaturized structure having a vibration-withstanding capability. An optical head assembly is disposed stationarily while an optical disk and a spindle motor for rotating the optical disk are disposed movably in a diametrical direction of the optical disk. The spindle motor is constituted by a brushless motor of a substantially semi-circular form in cross section and having a laterally truncated portion. The optical head assembly including an optical head and a laser circuit is disposed at the side of the laterally truncated portion.

4 Claims, 9 Drawing Sheets

OPERATING STATE OF LOCKING MECHANISM

SECTIONAL VIEW ALONG VIIB

OPTICAL DISK APPARATUS

BACKGROUND OF THE INVENTION

1. Field of the Invention

The present invention relates generally to an optical disk apparatus. More particularly, the invention is concerned with an optical disk apparatus which is advantageously suited for driving an optical disk having a diameter not greater than 3.5 inches and which can enjoy an excellent portability.

2. Description of the Related Art

The optical disk apparatuses known heretofore are mainly of such a structure in which a spindle motor for rotating an optical disk serving as a medium for storage of information is stationarily mounted and an optical head mechanism or head assembly including an optical head for recording and/or reproducing information on and/or from the optical disk and a laser circuit for emitting a light beam required for the operation of the optical head is caused to move linearly in the direction diametrically of the optical disk by means of a linear actuator.

The optical disk apparatus of the structure mentioned above however suffers from a problem that difficulty is encountered in speeding up the access operation of the optical head assembly to the optical disk because of heaviness of the head assembly. An approach for solving this problem is disclosed in Japanese Unexamined Patent Application Publication No. 85890/1989 (JP-A-1-185890). According to the proposal described in this publication, the optical head assembly is mounted stationarily while the spindle motor for rotating an optical disk is linearly moved relative to the head assembly in the diametrical direction of the disk by a linear actuator realized by using a voice coil. However, in this known apparatus, no consideration is paid to implementation of the apparatus in a miniature size of a thin and light weight structure capable of withstanding vibration. Thus, the optical disk apparatus mentioned above can not evade a shortcoming concerning the portability among others.

Another disadvantage of the optical disk apparatuses known heretofore is seen in that significant power consumption is involved because the optical disk is rotated by the spindle motor even when the apparatus is in the inactive state, performing neither recording nor reproduction of information on or from the optical disk.

In recent years, studies and developments aiming for high structural integration density and high data transfer rate of the optical disk apparatuses are reported, and the rotation speed of the spindle motor used therefore shows an yearly increase. However, this means in turn that the power consumption of the disk apparatus increases correspondingly. Under the circumstances, there exists a demand for decreasing the power consumption of the optical disk apparatuses particularly of those operated by an onboard battery.

SUMMARY OF THE INVENTION

In the light of the state of the art briefed above, it is therefore an object of the present invention to provide an optical disk apparatus of a novel structure which can avoid or alleviate the problems of the hitherto known disk apparatuses.

More particularly, it is an object of the present invention to provide a portable optical disk apparatus having a miniature and thin structure of light weight which is adapted for recording and/or reproducing information on and/or from an optical disk having a diameter less than 3.5 inches inclusive.

Another object of the invention is to provide an optical disk apparatus of the type mentioned above which can exhibit high capability of withstanding or resisting vibrations and external disturbances.

A further object of the invention is to provide an optical disk apparatus of the type mentioned above which can ensure a significant reduction in power consumption.

In view of the above and other objects which will become apparent as description proceeds, the present invention is directed to an optical disk apparatus which comprises an optical disk for storing information, the disk having a disk substrate of a maximum diameter not greater than 3.5 inches, a spindle motor for rotating the optical disk, an optical head assembly including an optical head for performing at least one of information recording and reproducing operations for the optical disk and a laser circuit for generating a light beam required for the operation of the optical head, and a coarse actuator for moving the spindle motor in a diametrical direction of the optical disk.

In the optical disk apparatus mentioned above, it is taught according to a first aspect of the invention that the optical head assembly is stationarily disposed on a base of the disk apparatus at a same side as the spindle motor for rotating the optical disk with reference to a surface of the optical disk.

In a preferred embodiment of the optical disk apparatus mentioned above, the spindle motor is constituted by a rotor for rotating the optical disk and a stator for generating a torque for rotation of the rotor, wherein the stator may preferably be so eccentrically relative to the rotor that the center axis of the stator is deviated from that of the rotor. With such configuration, the optical head assembly can be disposed in juxtaposition to the stator at a location where a distance between the center axis of the stator and an outer periphery thereof is minimum.

As a preferred embodiment of the optical disk apparatus mentioned above, it is further proposed to realize the spindle motor in the form of a brushless motor which includes a rotor constituted by a permanent magnet or magnets magnetized such that magnetic poles of N- and S-polarities make appearance alternately in a circumferential direction of the rotor.

In another preferred mode for carrying out the invention, the optical disk may be fixedly held on the rotor by making use of a magnetic force of the permanent magnet(s) constituting the rotor of the brushless motor.

Further, according to a second aspect of the invention, it is taught in the optical disk apparatus which the invention concerns that the coarse actuator is constituted by a movable member composed of a permanent magnet or magnets magnetized such that magnetic poles of N- and S-polarities make appearance alternately in a moving direction of the movable member and a pair of stators disposed in opposition to each other relative to the movable member with gaps being defined between the movable member and the stators, respectively, wherein the pair of stators is electrically energized with a phase difference of 90 degrees in terms of electric angle, and wherein the movable member and the stators cooperate to constitute a linear actuator for moving or displacing linearly the movable member.

According to a third aspect of the invention, it is proposed to provide securing means for mechanically preventing displacement of the spindle motor when the optical disk apparatus is in the inactive state.

According to a fourth aspect of the invention, there is provided for the purpose of lowering the power consumption among others an optical disk apparatus which comprises an optical disk for recording and/or reproduction of information, an electric motor for driving rotationally the optical disk, an optical head for recording and/or reproducing information on and/or from the optical disk, a tracking control unit for detecting position of the optical head, a coarse actuator control unit for driving the optical head in accordance with a signal outputted from the tracking control unit, a rotation speed control unit for controlling the rotation speed of the motor, and a signal processing unit for setting the rotation seed of the motor to a data transfer speed level in response to a request for access to the optical disk while decelerating the rotation speed of the motor to a stand-by level when no access request is issued within a preset time duration.

With the structure of the optical disk apparatus according to the first aspect of the invention, the disk apparatus can be realized in a thin structure because the space between the optical disk and the base (chassis) of the apparatus can effectively be utilized owing to such arrangement that the optical head assembly is stationarily disposed at the same side as the spindle motor for rotating the optical disk relative to a surface of the optical disk. Further, by disposing the optical system on the base or chassis of the disk apparatus, rigidity of a platform for securing the optical head is increased, whereby an enhanced vibration withstanding capability can be ensured.

Furthermore, by virtue of the preferred arrangement that the stator of the spindle motor is so configured as to be eccentrical to the rotor and that the optical head assembly is juxtaposed to the stator at a position where the distance between the center of the stator and the outer periphery thereof is minimum, the optical head can scan the optical disk up to the innermost track or periphery of the record area thereof notwithstanding of the thin structure of the optical disk apparatus. In this conjunction, it is noted that in the case of the optical disk apparatus known heretofore in which the stator and the rotor of the spindle motor are disposed concentrically with each other, the thickness of a laminated stator core must inevitably be increased in order to allow the optical head to scan the innermost track of the record area of the optical disk while assuring a same magnitude of torque as the spindle motor according to the invention. In other words, with the structure of the spindle motor used heretofore, it is impossible to realize the disk apparatus in a thin structure without sacrificing a so-called torque-volume ratio or structural integration density.

By employing as the spindle motor a brushless motor having a rotor constituted by a permanent magnet or magnets whose N- and S-poles make appearance alternately in the circumferential direction, high torque can be generated with a low inertial mass, which contributes not only to a further miniaturization of the disk apparatus of a low weight but also to high response performance thereof.

Further, owing to the arrangement for holding the optical disk on the rotor by utilizing a part of magnetic fluxes produced by the permanent magnet constituting the rotor of the brushless motor, any device dedicated for holding the optical disk is no more required, which also contributes to further reduction of weight of the optical disk apparatus.

With the structure of the optical disk apparatus according to the second aspect of the invention in which the coarse actuator is constituted by a linear motor having a movable member composed of a multi-pole permanent magnet or magnets, the thrust-volume ratio can significantly be increased when compared with the optical disk apparatus known heretofore in which the coarse actuator is constituted by the voice coil. By virtue of this feature, thickness of the coarse actuator and hence that of the optical disk apparatus as a whole can be decreased.

In the optical disk apparatus according to the third aspect of the invention, the movable parts of the apparatus can mechanically be secured fixedly by means of the locking mechanism which inhibits movement of the spindle motor relative to the optical disk, whereby portability as well as vibration withstanding capability of the optical disk apparatus can significantly be increased.

Moreover, by adopting the control system according to the fourth aspect of the invention, the power consumption of the spindle motor can remarkably be reduced by setting the motor speed to a low level so long as no access request to the disk is issued, whereby the use life of the power supply battery can correspondingly be elongated.

DESCRIPTION OF THE PREFERRED EMBODIMENTS

Now, the present invention will be described in detail in conjunction with preferred or exemplary embodiments thereof by reference to the accompanying drawings.

Figure 1:
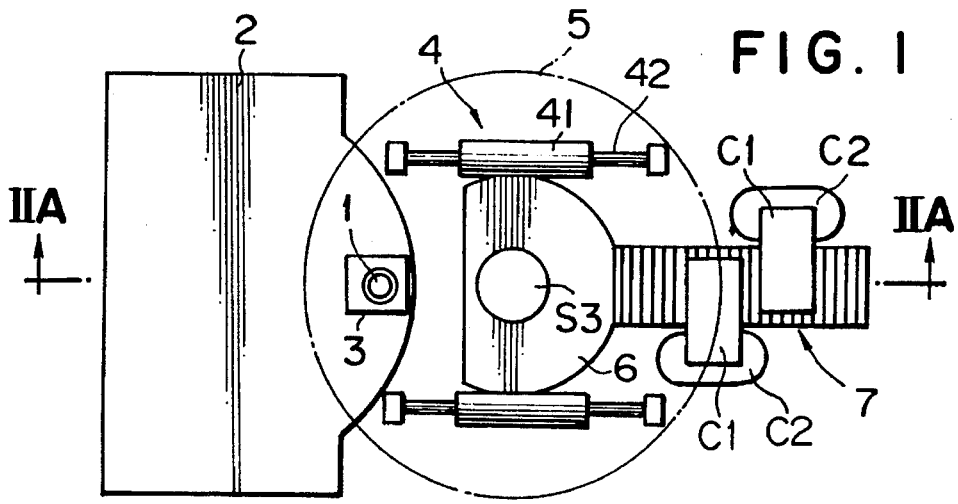
FIG. 1 is a top plan view showing schematically a structure of the optical disk apparatus according to an embodiment of the present invention.

FIG. 1 is a top plan view showing generally a structure of a movable disk type optical disk apparatus according to an embodiment of the invention, and FIG. 2 is a sectional view of the same taken along a line II A in FIG. 1. Description will first be directed to the structure of the disk apparatus. The movable disk type optical disk apparatus shown in FIG. 1 comprises a stationary optical head mechanism or assembly which includes a laser circuit 2 for generating a laser light beam and an optical head 1 constituted by an optical lens system and a two-dimensional actuator 3, wherein the optical head 1 is disposed on the top surface of the laser circuit 2, as viewed in the figure, for performing auto-focusing/ auto-tracking operations in a manner known per se. An optical disk 5 shown in a phantom line in FIG. 1 is adapted to be fixedly held on a rotor S3 of a spindle motor 6. Connected to the spindle motor 6 is a movable member C3 which constitutes a movable part of a coarse actuator 7 and slider sleeves 41 constituting movable parts of linear guide assemblies 4 which are disposed in diametrical opposition to each other at both sides of the spindle motor 6 and in parallel to the coarse actuator 7. On the other hand, guides 42 each constituting a stationary part of the linear guide assembly 4 as well as stator cores C1 and coils C2 constituting stationary parts of the coarse actuator 7 are fixedly mounted on a base or chassis 18 (refer to FIG. 2) which constitutes a standard stationary part of the optical disk apparatus.

The spindle motor 6 is composed of a rotor S3 for holding and rotating the optical disk 5 and a stator S1 for generating a torque for rotation of the rotor S3, wherein the center axis of the stator S1 is eccentrically deviated from that of the rotor S3. More specifically, the stator S1 has a substantially semicircular cross-section in the case of the illustrated embodiment of the disk apparatus, wherein the optical head assembly (1, 2, 3) is disposed at a position where the distance between the center axis of the stator S1 and the outer periphery thereof is minimum, i.e., at a position adjacent to a chordal outer surface of the semicircular stator core of the spindle motor (see FIG. 1). In this conjunction, it is to be noted that torque generating means is not provided at the chordal stator core portion where the distance between the center axis of the rotor S3 and the outer periphery of the stator S1 is short but provided in and along a semicircular or arcuate stator portion where the above-mentioned distance is long.

On the other hand, the coarse actuator 7 is composed of a movable number C3 constituted by a permanent magnet or an array of permanent magnets (hereinafter collectively referred to as the permanent magnet) magnetized such that a plurality of N-poles and a plurality of S-poles make appearance alternately in a linear array and a pair of stator members each constituted by a U-like stator core C1 of a magnetic material and a coil C2 wound on the stator core C1, wherein both the stator members of the coarse actuator 7 are disposed in opposition to each other with a distance therebetween in the moving direction of the movable member C3 so that the movable member C3 can extend through the spaces defined between the legs of the U-like stator cores C1, respectively, as can be seen from FIG. 1. In that case, a small gap is defined between closely adjacent portions of the movable member C3 and each of the stator cores C1, respectively. Further, each of the stator cores C1 is provided with magnetic pole teeth in the inner surface thereof at a pitch corresponding to that at which the permanent magnet of the movable member C3 is magnetized in the alternating polarities, as can be seen in FIG. 2. Representing the pitch of the alternate magnetization of the permanent magnet of the movable member C3 by 360 degrees in terms of electric angle, the pair of stator members (C1, C2) are disposed with a phase difference of 90 degrees in terms of the electric angle, whereby a two-phase linear motor is realized through cooperation of these paired stator members (C1, C2) and the multi-pole permanent magnet constituting the movable member C3.

In operation of the optical disk apparatus according to the instant embodiment of the invention, the optical disk 5 fixedly held on the rotor S3 of the spindle motor 6 is rotated by that motor 6 and at the same time caused to move linearly in the diametrical direction of the disk 5 relative to the stationary head assembly (1, 2, 3) under a thrust exerted by the coarse actuator 7. At this juncture, it is to be noted that the spindle motor 6 is imparted with such outer configuration or profile that the optical head 1 can make access to the optical disk 5 throughout the whole recording area from the outermost track to the innermost track thereof. Parenthetically, the optical head 1 includes the objective lens system and movable permanent magnets (not shown) constituting parts of the two-dimensional actuator 3, as described previously, wherein the objective lens system is caused to swing in the vertical and horizontal directions under the action of the electromagnetic force of coils mounted on a stationary part of the two-dimensional actuator for realizing the auto-focusing/auto-tracking operation, whereby possible eccentricity of the optical disk 5 as well as wavering rotation thereof can be compensated for.

Referring to FIG. 2 which shows the optical disk apparatus in a cross-sectional view, the optical head assembly is fixedly secured to the base 18 (which may be a part of a chassis of the apparatus) with a vibration isolating or absorbing member 17 being interposed therebetween. Additionally, the stator cores C1 of the coarse actuator 7 are also secured fixedly to the base 18 so that the spindle motor 6 is caused to move linearly by the movable member (permanent magnet) C3. As a result of this, the optical disk 5 can move linearly in the diametrical direction thereof while being rotated by the rotor S3 of the spindle motor 6. The coarse actuator 7 is realized in the form of a two-phase linear motor, wherein the stator cores C1 of the actuator 7 which are disposed stationarily are each provided with teeth at a pitch corresponding to that of the magnetic poles of the multi-pole permanent magnet constituting the movable member C3 of the coarse actuator 7. The paired stator cores C1 are disposed stationarily at respective positions deviated each other in phase by 90 degrees in terms of the electric angle of the magnetic poles of the movable member C3.

Figure 2A:
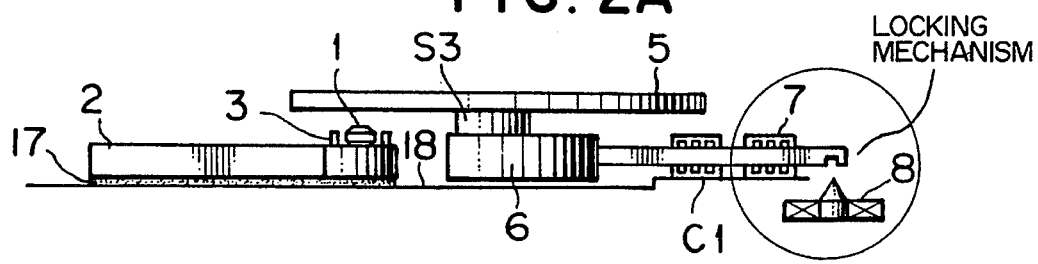
FIG. 2A shows the same in a vertical-sectional view taken along a line II A in FIG. 1.
Figure 2B:
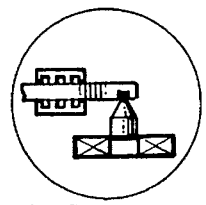
FIG. 2B is a partial view showing a portion enclosed by a circle in FIG. 2A for illustrating operation of a locking mechanism.

Referring to FIGS. 2A and 2B, there may be provided a locking mechanism which is constituted by a retaining or stopper member 8 mounted fixedly and at least one recess or groove formed in the movable member C3 of the coarse actuator 7 and adapted to be engaged by the stopper member 8, as shown in FIG. 2B, when the optical disk apparatus is at rest, i.e., in the inactive state. By virtue of this locking mechanism, the optical disk can be protected from external vibration or perturbation which the disk may experience during transportation or for other causes.

It should be mentioned that the locking mechanism described above may be provided alternatively in combination with the spindle motor 6 in place of the coarse actuator 7, to a substantially same effect.

Figure 3A:
FIG. 3A is a fragmental sectional view showing schematically an integral structure of a coarse actuator and a stator of a spindle motor adopted in an optical disk apparatus according to another embodiment of the invention.
Figure 3B:
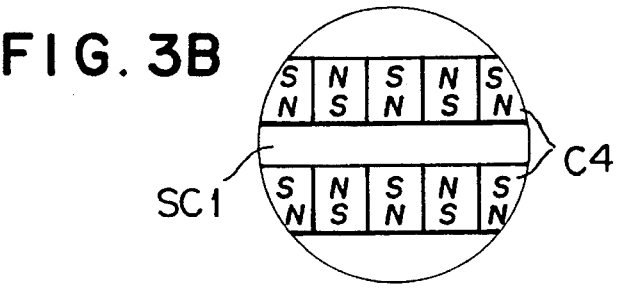
FIG. 3B is a partially enlarged view showing a portion enclosed by a circle in FIG. 3A.

FIG. 3A is a view showing an integral structure of the spindle motor 6 and the coarse actuator 7 according an embodiment of the invention. The stator core S1 of the spindle motor 6 is formed by stacking a plurality of core sheets or laminate SC1 of a magnetic material such as silico-iron sheet or the like. In that case, at least one of the core sheet SC1 located substantially at the center of the stator core lamination S1 as viewed thicknesswise thereof is so formed as to have an integral extension projecting in the diametrical direction of the stator core S1 and having a same shape as that of the movable member C3 of the coarse actuator 7. By disposing fixedly individual permanent magnet elements magnetized with N- and S-polarities on upper and lower surfaces of the extension of the center core sheet or sheets SC1 in a polarity alternating array, respectively, the movable member C3 of the coarse actuator 7 is realized in such a structure in which a magnetic core (constituted by the extension of the stator core sheet SC1) is sandwiched between a pair of permanent magnets each magnetized so that N- and S-polarities make appearance alternately in the moving direction of the movable member C3, as can best be seen from FIG. 3B. In that case, the permanent magnet should preferably be magnetized at a fine pitch on the order of 2 mm. As the material of the permanent magnet, there may be mentioned rare earth magnet such as neodymium magnet, ferrite magnet and the like.

As is apparent from the foregoing, according to the illustrated embodiment of the invention, the optical head assembly is disposed stationarily at a same side as the spindle motor for rotating the optical disk with reference to a surface of the optical disk (lower surface in the case of the illustrated embodiment), whereby the space available between the optical disk and the base can effectively be utilized for allowing the spindle motor and the disk to move linearly relative to the stationary head assembly. Thus, a thin structure of the optical disk apparatus can be realized. Additionally, rigidity of a platform for securing the optical head can be increased by disposing fixedly the optical system on the base (chassis) of the optical disk apparatus, whereby vibration withstanding capability of the optical disk apparatus can be enhanced.

Further, by virtue of the eccentric disposition of the stator of the spindle motor relative to the rotor thereof in combination with the disposition of the optical head assembly at a position where the distance between the center axis of the stator and the outer periphery thereof is minimum (i.e., at the position confronting a laterally truncated side of the stator in the case of the illustrated embodiment), the optical head can scan the optical disk up to the innermost track of the recording area thereof without sacrificing the benefit of the thin structure of the optical disk apparatus.

Besides, the coarse actuator implemented in the form of a linear motor including a multi-pole permanent magnet as the linearly movable member can increase a thrust-volume ratio as compared with the voice-coil motor adopted heretofore, as a result of which the thickness of the coarse actuator and hence that of the optical disk apparatus on the whole can further be reduced.

It should further be noted that the integral structure of the spindle motor and the coarse actuator realized by using in common the stator core sheet(s) of the spindle motor as the core of the movable member of the coarse actuator is advantageously accompanied with reduction in the number of parts of the optical disk apparatus as well as reduction in the number of steps for manufacturing the same. Besides, mechanical strength and precision of a coupling portion for interconnecting the coarse actuator and the spindle motor can be increased, which in turn contribute to improvement of reliability in operation of the optical disk apparatus.

Finally, the locking mechanism for mechanically inhibiting the movement of the spindle motor when the optical disk apparatus is at rest can assure an excellent vibration-proof property of the apparatus whose portability is thereby enhanced.

Figure 4:
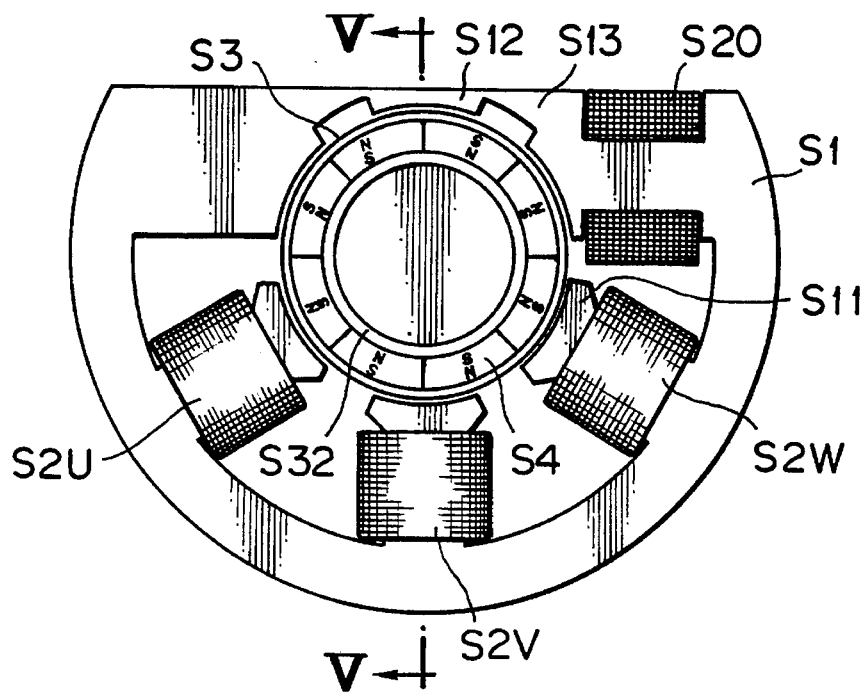
FIG. 4 is a top plan view showing schematically a structure of a brushless motor employed as the spindle motor according an embodiment of the invention.
Figure 5:
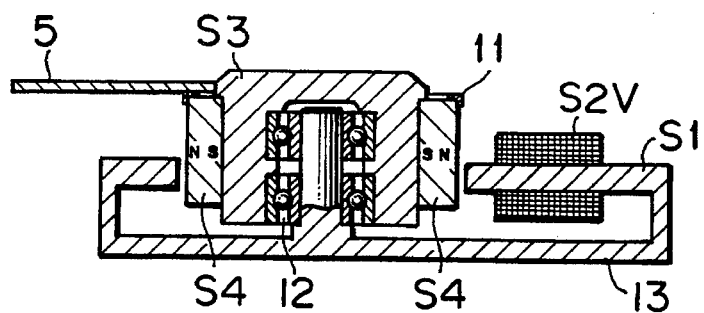
FIG. 5 shows the same in a vertical-sectional view taken along a line V in FIG. 4.

FIG. 4 shows in a top plan view a structure of the spindle motor according to another embodiment of the invention, and FIG. 5 shows the same in a sectional view taken along a line V in FIG. 4.

Referring to the figures, the spindle motor 6 is implemented in the form of a brushless motor including a rotor constituted by a ring-like multi-pole permanent magnet and a stator equipped with three-phase coils for generating a rotating magnetic field. More specifically, the rotor generally denoted by S3 is constituted by an annular permanent magnet array AS4 magnetized circumferentially in alternating N- and S-polarities substantially at an equi-pitch and rotor yokes S32 for forming a magnetic circuit of the rotor. On the other hand, the stator includes three-phase magnetic pole cores S11 each including a coil S2 (S2U, S2V, S2W) wound thereon, a magnetic pole core S12 having no coil and wound a stator core S1 disposed at the outer periphery of the motor for magnetically coupling the magnetic pole cores S11 and S12 to one another. (For convenience of the description, the chordal stator core portion of the semicircular stator core S1 at which the magnetic pole core S12 having no coil is disposed is referred to as a short-circuit yoke S13.) The magnetic pole cores have respective inner pole-shoes confronting the rotor S3 with gaps defined therebetween, respectively. The rotor S3 is rotatably supported on a shaft formed integrally with a stator casing 13 by means of a bearing 12 (refer to FIG. 5). By supplying the currents of U-, V- and W-phases to the coils S2U, S2V and S2W, respectively, torque is generated in cooperation with the multi-pole permanent magnet array S4, whereby the rotor S3 is rotated.

An advantageous feature of the spindle motor according to the instant embodiment can be seen in that the outer peripheral configuration of the stator is so designed that the distance from the center axis of the rotor to the outer periphery of the stator differs as a function of angle within a predetermined angular range. More particularly, the stator has an approximately semicircular form in cross section in the case of the illustrated embodiment, wherein the predetermined angular range within which the distance from the center axis of the rotor to the outer periphery of the stator differs as a function of angle is formed by a linear outer surface portion of the stator (i.e., so-called laterally truncated surface portion of the stator), as can best be seen from FIG. 4. The magnetic pole core S12 disposed in the laterally truncated or chordal stator portion has no coil and hence no torque is positively generated between the core S12 and the rotor S3. Thus, the magnetic pole core S12 constitutes, so to say, a torque non-generating section. In these respects, the spindle motor according to the instant embodiment differs from the motors known heretofore and can provide advantageous effects mentioned below. First, the magnetic pole core S12 can play a role of reducing a so-called cogging torque of the rotor, while the short-circuit yoke S13 serves as a magnetic shield for preventing leakage of magnetic fluxes produced by the permanent magnet of the rotor and the coils S2U, S2V, S2W and at the same time protects the optical head and the permanent magnet rotor from being injured due to runaway of the coarse actuator 7.

In a preferred modification of the instant embodiment, an FG coil S20 may be wound on the stator core S1 in a manner illustrated in FIG. 4. With this structure, the alternating magnetic flux induced in the stator core S1 intersects the FG coil S20 to induce a voltage therein, which voltage is detected to be utilized for detecting indirectly the angular position of the rotor, which will be described later on. In this conjunction, it will readily be understood that sensitivity of the detection can be increased by increasing the number of turns of the FG coil S20.

It should further be noted that in the spindle motor according to the instant embodiment, the optical disk is adapted to be held fixedly on the rotor by utilizing the magnetic flux leaking from the permanent magnet array S4 constituting a main part of the rotor, as shown in FIG. 5. As a modification of the instant embodiment, it is preferred to dispose a magnetic attraction regulating ring 11 between the optical disk 5 and the permanent magnet S4 for thereby making it possible to adjust the attraction exerted by the permanent magnet S4. To this end, the attraction adjusting ring 11 may be formed of a nonmagnetic material.

As will now be understood from the forgoing, implementation of the spindle motor for directly driving the optical disk in the form of a brushless motor can assure availability of a high torque density (i.e., high torque per volume of the motor). By virtue of this feature, the motor can effectively be realized in a miniature size with light weight even when the torque non-generating section is provided as a part of the stator. To say in another way, the outer diameter of the stator can be reduced in the torque non-generating portion (i.e., laterally truncated portion) and the optical head assembly can be juxtaposed adjacent to and in opposition to the diameter-reduced torque non-generating portion of the stator. In this manner, the thickness or height of the optical disk apparatus as a whole can significantly be reduced when compared with the disk apparatus known heretofore in which the optical head assembly is disposed above the upper surface of the optical disk in opposition to the spindle motor in contrast to the inventive arrangement in which the optical head assembly is disposed at the same side (i.e., below a lower surface of the optical disk in the case of the illustrated embodiment) as the spindle motor in juxtaposition thereto.

Further, since that portion of the stator of the brushless motor which is located at the side adjacent to the optical head actuator is magnetically shield by the stator core and has no aperture either in the magnetical or mechanical sense, not only the optical head but also the rotor of the motor can be protected against injury due to erroneous operation of the head, whereby reliability of the optical disk apparatus can be enhanced. Besides, because variation in the magnetic flux as well as pulsation of rotation (cogging torque) of the spindle motor and the influence of the magnetic leakage of the permanent magnet rotor to the optical head can be suppressed to a minimum, the positioning accuracy of the optical head can significantly be increased, to a further advantage.

In the case of the illustrated embodiment of the optical disk apparatus according to the present invention, it has been described that the spindle motor presents the outer configuration of substantially semicircle in cross-section and that the portion of the stator core where the distance from the center axis to the outer diameter of the stator differs as a function of angle is realized in a linear or planar form (i.e., laterally truncated or chordal form). It goes however without saying that the invention is never restricted to such geometrical configuration. In other words, the stator core portion of concern may have any other shape than the linear flat surface so far as there can be obtained a space for accommodation of the optical head driving actuator.

It should also be mentioned that owing to the structure in which the optical disk is held stationarily by a part of magnetic flux produced by the permanent magnet constituting the rotor of the brushless motor, provision of any device dedicated for holding the optical disk is rendered unnecessary, which in turn contributes to a further reduction of the weight of the optical disk apparatus.

Figure 6:
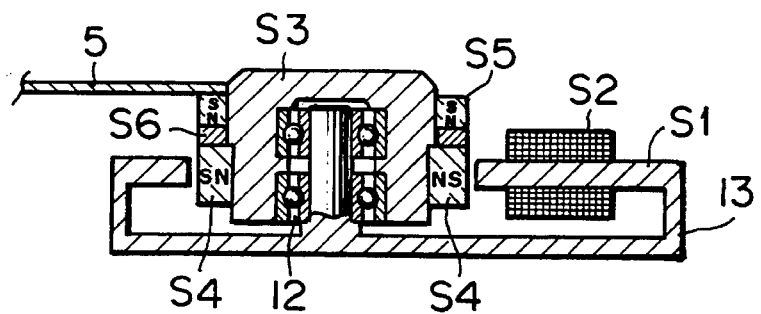
FIG. 6 is a sectional view showing a structure of the spindle motor according to another embodiment of the invention.

FIG. 6 shows an optical disk apparatus according to another embodiment of the present invention. In the case of this embodiment, a second permanent magnet S5 is additionally provided for holding more positively the optical disk 5 thereon. More specifically, the second permanent magnet S5 is disposed on the permanent magnet S4 in the case of the motor structure shown in FIG. 5, wherein the permanent magnets S4 and S5 are separated from each other by a partitioning sheet S6 of a nonmagnetic material. It should further be noted that the disk holding permanent magnet S5 is so magnetized that N- and S-polarities make appearance in the direction thicknesswise of the spindle motor in contrast to the rotor permanent magnet S4 which is so magnetized that N- and S-polarities make appearance in the diametrical direction of the rotor. The structure according to the instant embodiment is advantageous in that not only the optical disk can positively be held stationarily under attraction of the second permanent magnet S5 but also influence of external magnetic disturbance to the magnetic field of the permanent magnet S4 can more be suppressed more positively, as a result of which variation in the motor torque can further be suppressed. In the optical disk apparatus according to the instant embodiment, the permanent magnet holding force can easily be adjusted by selecting appropriately the material of the permanent magnet S5.

Figure 7A:
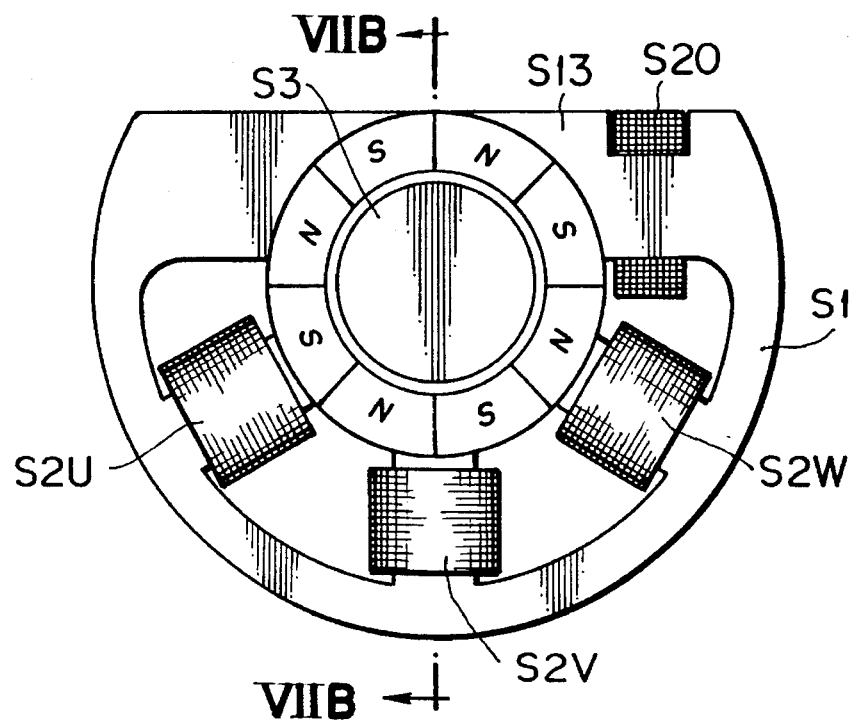
FIG. 7A is a plan view showing a structure of a brushless motor according to a further embodiment of the invention.
Figure 7B:
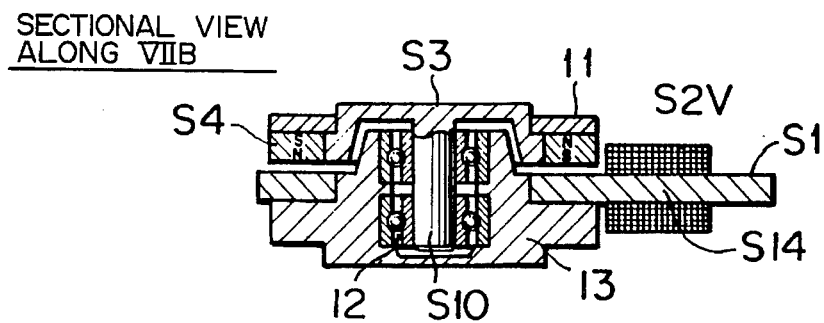
FIG. 7B is a sectional view of the same taken along a line VII B in FIG. 7A.

FIG. 7A is a top plan view showing schematically a structure of a spindle motor in the optical disk apparatus according to a still further embodiment of the invention, and FIG. 7B is a vertical sectional view of the same taken along a line VII B in FIG. 7B. The motor structure of this embodiment is substantially similar to that of the permanent magnet brushless motor shown in FIG. 4 except that the magnetic poles of the permanent magnets constituting the rotor S3 are so disposed as to confront the magnetic poles of the stator cores S14 in the direction thicknesswise of the motor with a planar gap defined therebetween, as can best be seen from FIG. 7B.

In the spindle motor according to this embodiment, the outer diameter of the rotor can be increased up to the outer periphery of the short-circuit yoke of the stator (see FIG. 7A), whereby the inertia moment of the rotor S3 can be increased when compared with the motor structure shown in FIG. 4 in which the magnetic poles of the rotor and the stator are disposed in diametrical opposition to each other. Thus, the instant embodiment provides an advantage that a higher stabilization of the rotational speed of the motor can be assured.

Figure 8:
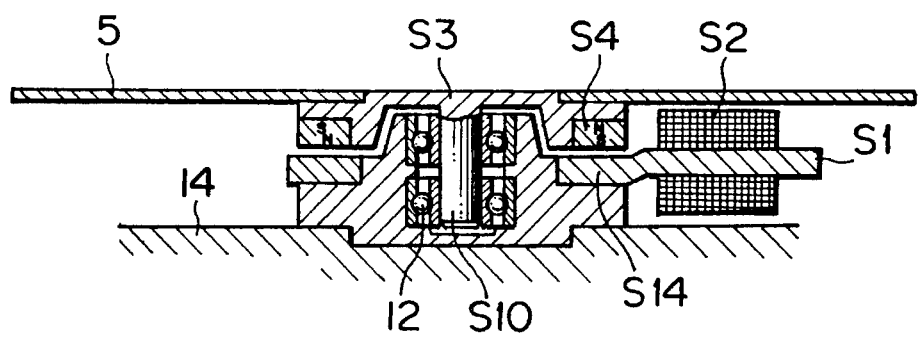
FIG. 8 is a view showing a structure of the brushless motor according to another embodiment of the invention.

FIG. 8 is a vertical sectional view showing a spindle motor according to still another embodiment of the invention. The illustrated structure of the spindle motor differs from that shown in FIGS. 7A and 7B in that the stator core portions of the spindle motor 6 are bent in the radial direction thereof except for the portions of the magnetic pole cores S14 which are located in opposition to the magnetic poles of the rotor permanent magnet S4. The structure of this embodiment is advantageous in that the thickness of the spindle motor can further be decreased, because the stator coils S2 can be disposed substantially at a center position between the base or chassis 14 and the optical disk 5 (i.e., with equi-distance to the disk and the chassis). To say in another way, a spindle motor of higher torque can be realized for a given thickness thereof because each stator coil S2 can be wound with a greater number of turns.

Figure 9:
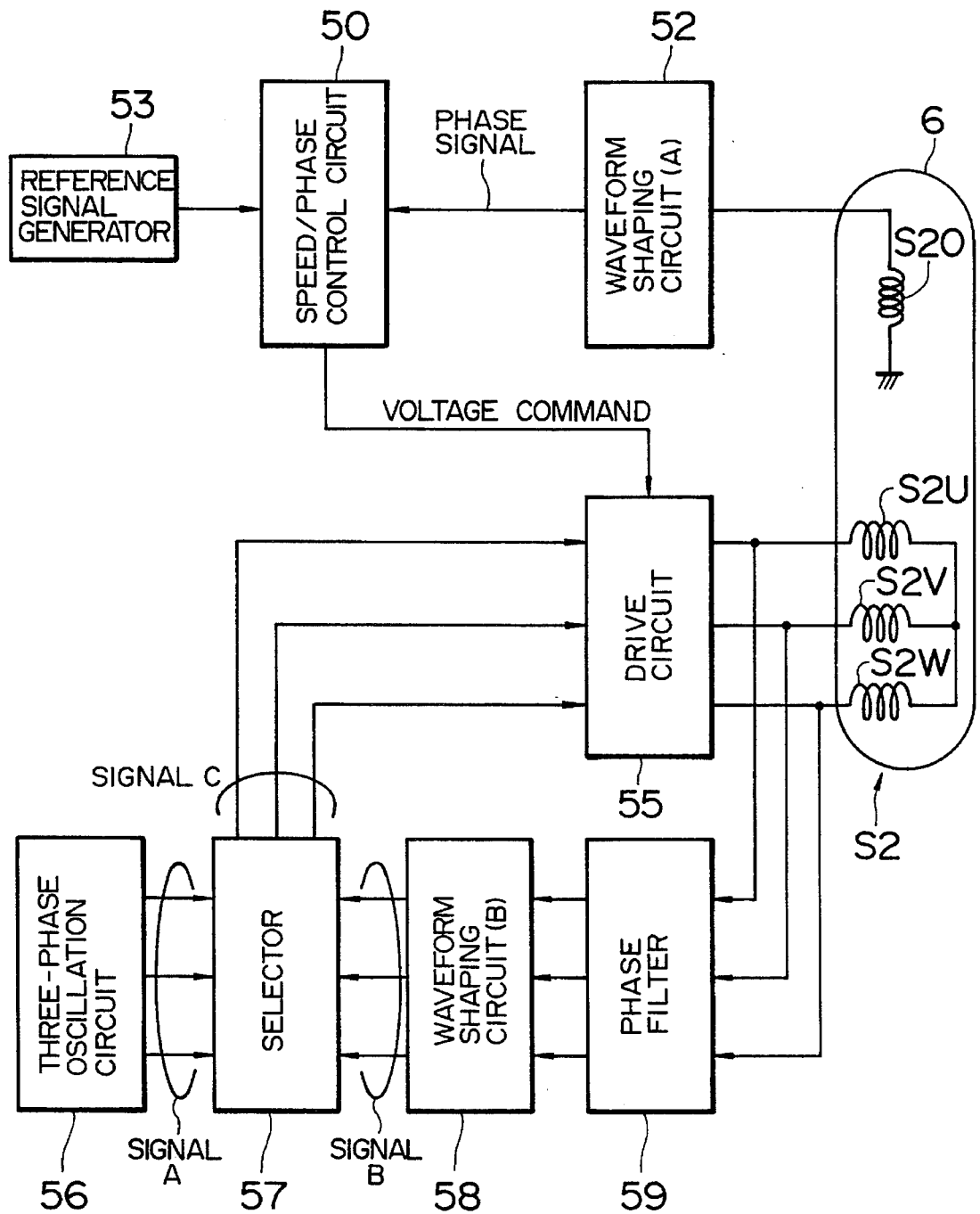
FIG. 9 is a block diagram showing a spindle motor driving circuit according to an embodiment of the present invention.

FIG. 9 is a block diagram showing a spindle motor driving circuit according to an embodiment of the present invention. Description will first be directed to the structure of the driving circuit.

Referring to the figure, a numeral 56 denotes a three-phase oscillation circuit 56 whose output is coupled to input of a selector 57 as indicated generally by a signal A, the selector 57 having other input supplied with signals (indicated as a signal B) which result from processing of a voltage signal induced in the motor coils S2 successively through a phase filter 59 and a waveform shaping circuit (B) 58. Output signal (signal C) of the selector 57 is supplied to input of a drive circuit 55 which has output connected to the input of the aforementioned phase filter 59 and the stator coils S2 (u,v,w) of the spindle motor 6, respectively. On the other hand, an output signal of the FG coil S20 described hereinbefore (FIG. 4) is coupled to an input of another waveform shaping circuit (A) 52 whose output signal is applied to an input of a speed/phase control circuit 50 which has another input supplied with an output signal of a reference signal generator 53 designed to generate a speed/phase command signal. The output signal of the speed/phase control circuit 50 is applied to an input of the drive circuit 55 as the speed/phase command for the spindle motor S20.

Description turns to operation of the spindle motor driving circuit of the structure mentioned above. Upon starting of the spindle motor, the three-phase signal (signal A) of a low frequency outputted from the three-phase oscillation circuit 56 is inputted as the signal C to the drive circuit 55 through the selector 57. Then, a three-phase voltage corresponding to the signal C is applied to the stator coils S2 of the spindle motor 6 from the drive circuit 55. Thus, whereby the motor 6 starts to rotate at a low frequency in an open control loop in the starting phase.

After the spindle motor 6 has been started, the selector 57 is changed over for allowing the three-phase voltage to be applied from the drive circuit 55 to the motor coils S2 in synchronism with the magnetic pole position of the rotor by utilizing the phase signal (signal B) derived from the voltage induced in the spindle motor 6. In this way, voltage control of the spindle motor 6 is performed through a closed control loop.

On the other hand, a voltage is induced in the FG coil S20 wound on the stator core S1 of the spindle motor 6 as mentioned hereinbefore due to the alternating magnetic flux flowing through the stator core S1. From this FG coil induction voltage, an alternating signal (having a frequency corresponding to the number of magnetic poles of the rotor) is derived for every complete rotation of the rotor 1 and shaped into a signal of rectangular waveform by the shaping circuit (A) 52. On the basis of the rectangular pulses outputted from the waveform shaping circuit (A) 52, the rotational speed of the rotor is arithmetically determined by the speed control circuit 50 and then compared with the speed command signal supplied from the reference signal generator 53. A voltage command generated on the basis of the difference resulting from the comparison is then supplied to the drive circuit 55. The speed control of the spindle motor 6 is realized in this way.

Heretofore, in the arithmetic determination of the rotational speed of the rotor, the phase signal (signal B) of the voltage induced in the motor has been made use of. This method however suffers from a problem that the speed detection accuracy is degraded due to presence of numerous harmonics in the detected voltage signal. In contrast, by providing the FG coil S20 according to the teaching of the invention, there can be obtained a signal which is not affected by the current flowing through the motor coils S2, i.e., a signal scarcely containing harmonic components. Thus, the accuracy of the rotor position detection can significantly be improved according to the invention when compared with the detection based on the output signal of the waveform shaping circuit (B) 58. In reality, result of an experiment performed for ascertaining the speed control accuracy shows that variation in the rotational speed of the spindle motor can be reduced by a factor of ca. 10 at 3600 rpm when compared with the speed control known heretofore.

Figure 10:
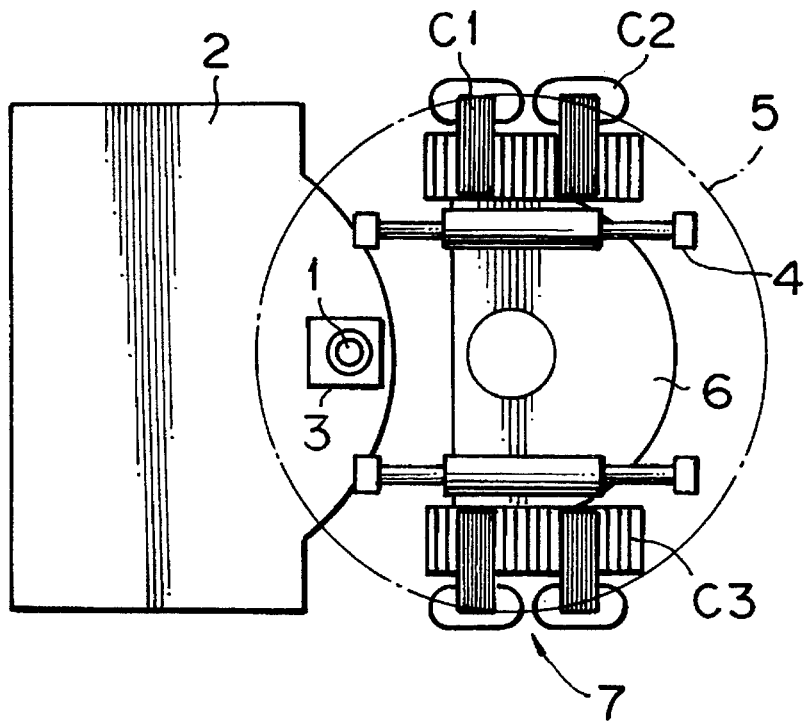
FIG. 10 is a top plan view showing schematically an optical disk apparatus according to still another embodiment of the invention.

FIG. 10 shows an optical disk apparatus according to a further embodiment of the invention. This embodiment differs from the first embodiment shown in FIG. 1 in that a pair of coarse actuators 7 are provided at both sides of the spindle motor 6, respectively, in diametrical opposition to each other.

With the structure shown in FIG. 10, influence of the torque of the spindle motor exerted to the linear movement of that motor can be suppressed to a minimum, whereby the optical disk positioning accuracy can further be improved, to an advantage.

Figure 11:
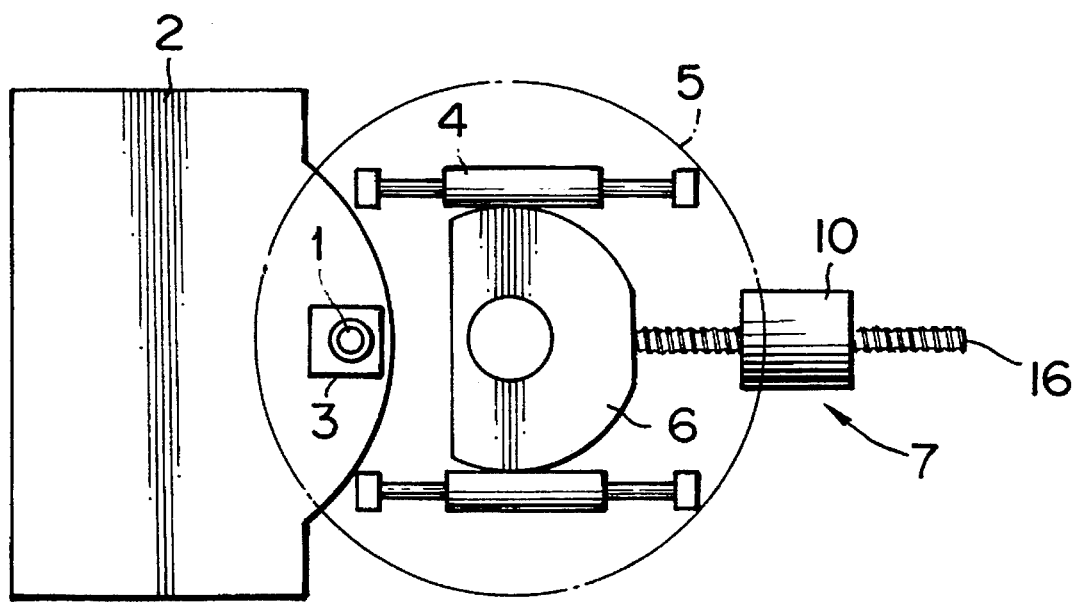
FIG. 11 is a top plan view showing schematically an optical disk apparatus according to yet another embodiment of the invention.

FIG. 11 shows a still further embodiment of the invention. The illustrated optical disk apparatus differs from that of FIG. 1 in that a combination of a revolving armature type motor 10 and a feed screw 16 is employed in place of the linear coarse actuator 7. More specifically, the movable member extending in the direction for linearly moving the spindle motor 6 is constituted by the feed screw 16, which is combined with the revolving armature type motor 10 including a rotor engaging screwwise with the feed screw 16 and a stator for generating a torque for revolution of the rotor. With this structure, the revolution of the rotor 10 is converted to a linear movement of the feed screw 16 for moving linearly the spindle motor 6.

The instant embodiment is advantageous in that the rigidity and hence the vibration withstanding capability of the optical disk apparatus can be enhanced owing to the use of the mechanical element, i.e., the feed screw 16 as the means for moving linearly the spindle motor 6.

Figure 12:
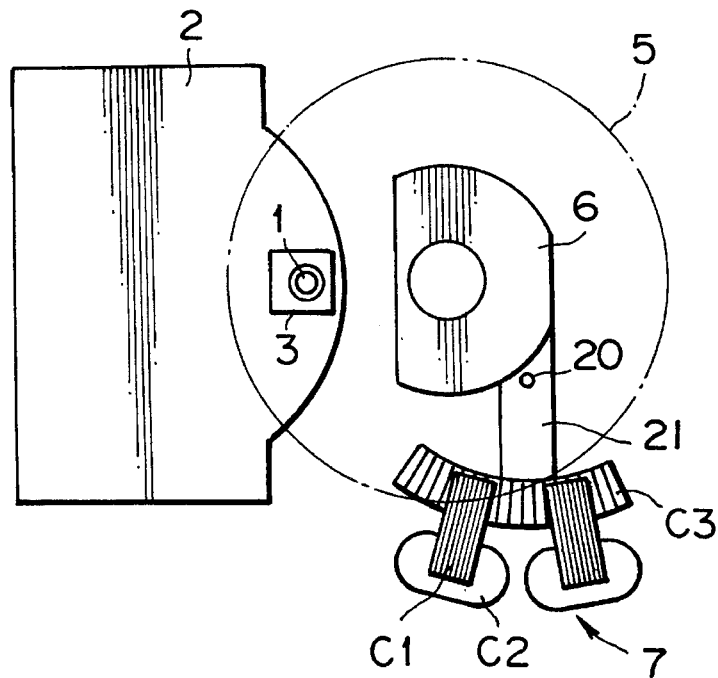
FIG. 12 is a top pan view showing schematically an optical disk apparatus according to a further embodiment of the invention.

FIG. 12 shows yet another embodiment of the invention, which differs from that of FIG. 1 in that the spindle motor 6 is adapted to move along an arcuate path about a supporting shaft 20 instead of moving along a linear path. To this end, a movable member C3 of the coarse actuator 7 is mechanically coupled to the spindle motor 6 by means of a supporting shaft or stud 20 secured to a stationary part of the disk apparatus. With the structure of the instant embodiment, the spindle motor 6 is caused to move along an arcuate path around the fulcrum defined by the supporting stud 20 by the coarse actuator 7. In this conjunction, it is to be noted that although the movable member C3 of the coarse actuator 7 is implemented in an arcuate form in order to move the spindle motor 6 along the arcuate path around the supporting stud 20 of the swingable arm 21, the movable member (C3) of the coarse actuator 7 may equally be realized in a linear form particularly in the case of the optical disk apparatus where the distance to be covered by movement of the spindle motor 6 is small, e.g. on the order of 1 or 2 inches.

With the optical disk apparatus described above, the coarse actuator 7 can be disposed beneath the optical disk owing to the structure that the movable member C3 of the coarse actuator moves along an arcuate path, whereby remarkable miniaturization of the optical disk apparatus can be attained by effective utilization of the available space.

Figure 13:
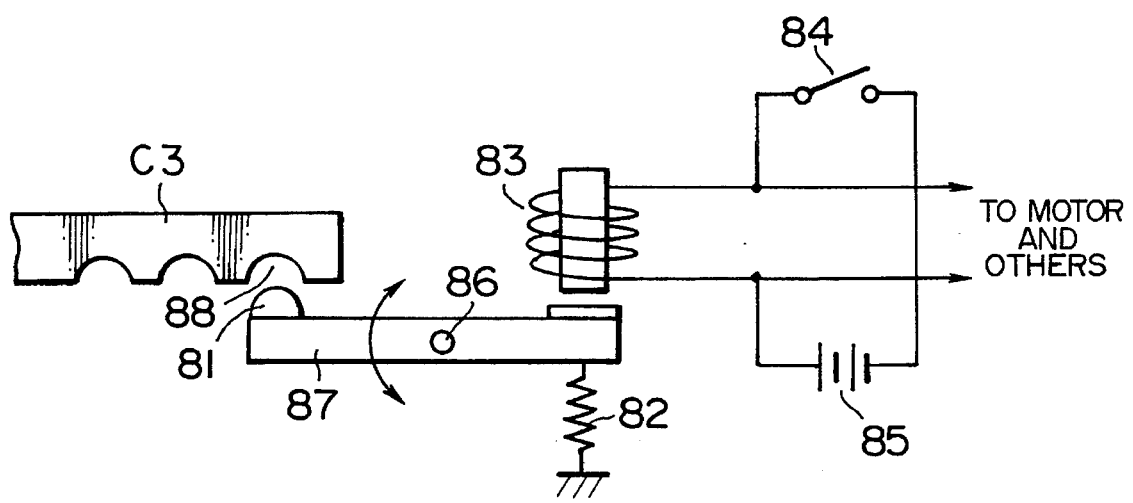
FIG. 13 is a view showing a locking mechanism which may be incorporated in the optical disk apparatus according to an embodiment of the present invention.

FIG. 13 shows another embodiment of the invention which is directed to automatic actuation of the locking mechanism shown in FIG. 2. Referring to FIG. 13, a swingable arm 87 is pivotally mounted on a supporting stud 86 secured fixedly to a stationary port of the optical disk apparatus and has a lock pin 81 secured to one end thereof. On the other hand, holes or recesses 88 for releasably receiving the lock pin 81 are formed in a free end portion of the movable member C3. A tension spring 82 is disposed at the other end of the arm 87 so that the lock pin 81 is caused to lodge in one of the recesses 88 under the force of the spring 82 to thereby secure the movable member C3 when the optical disk apparatus is at rest (i.e., in the inactive state). Disposed in opposition to the tension spring 82 is an electromagnet 83 whose solenoid is connected to a power source constituted by a battery via a switch 84 which in turn is interlocked with a power on/off main switch (not shown) of the optical disk apparatus so that upon turning-on of the latter, the switch 83 is simultaneously closed to electrically energize the electromagnet 83 for thereby swing the arm 87 against the force of the tension spring 82. This results in disengagement of the lock pin 81 from the recess 88 to allow the linear movement of the movable member C3. Reversely, when the main switch of the optical disk apparatus is opened, the switch 84 of the locking mechanism is also automatically opened to allow the lock pin 88 to engage in the recess 88 under the force of the tension spring 82. In this manner, the locking mechanism is automatically operated in response to turn-on/off of the main switch of the disk apparatus.

The instant embodiment is advantageously suited for application to a portable-type optical disk apparatus for increasing the vibration withstanding capability as well as operation reliability of the disk apparatus.

Parenthetically, the optical disk apparatus according to the invention in general can find application as memory equipment for handy-type personal computers, word processors, compact disk players, electronic cameras, navigation systems, electronic databases or the like and contribute to miniaturization and improvement of portability and reliability of these apparatuses.

Figure 14:
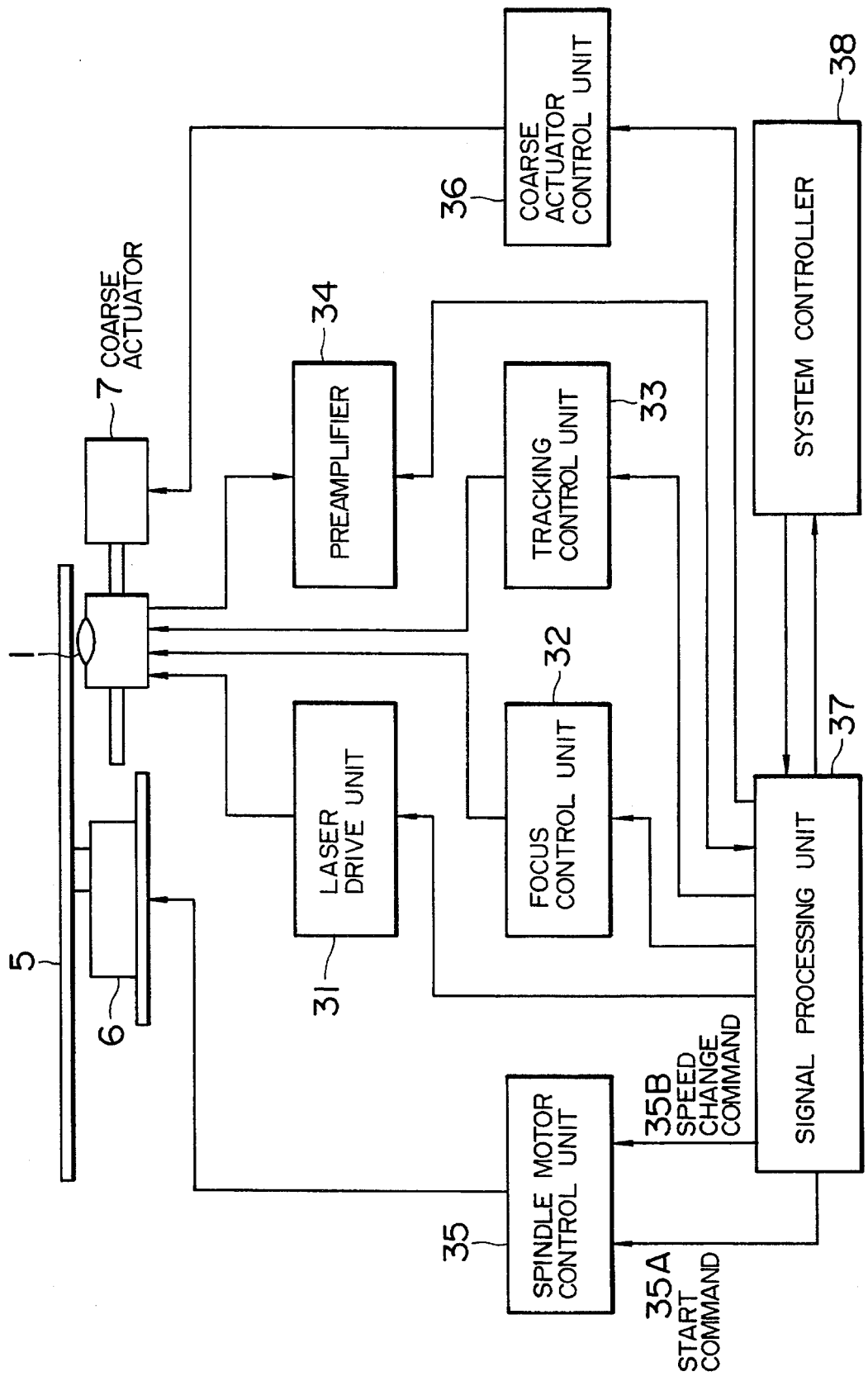
FIG. 14 is a block diagram showing a general arrangement of a control circuit which can be adopted in the optical disk apparatus according to an embodiment of the invention.

FIG. 14 is a block diagram showing a basic circuit configuration of a control apparatus for controlling the optical disk apparatus according to another embodiment of the invention. The control apparatus includes a spindle motor control unit 35, a coarse actuator control unit 36, a focus control unit 32, a tracking control unit 33, a preamplifier 34 for amplifying a regenerated record signal, a signal processing unit 37 for issuing commands to the control units mentioned above and a system controller 38 serving as a system of a higher rank.

Figure 15:
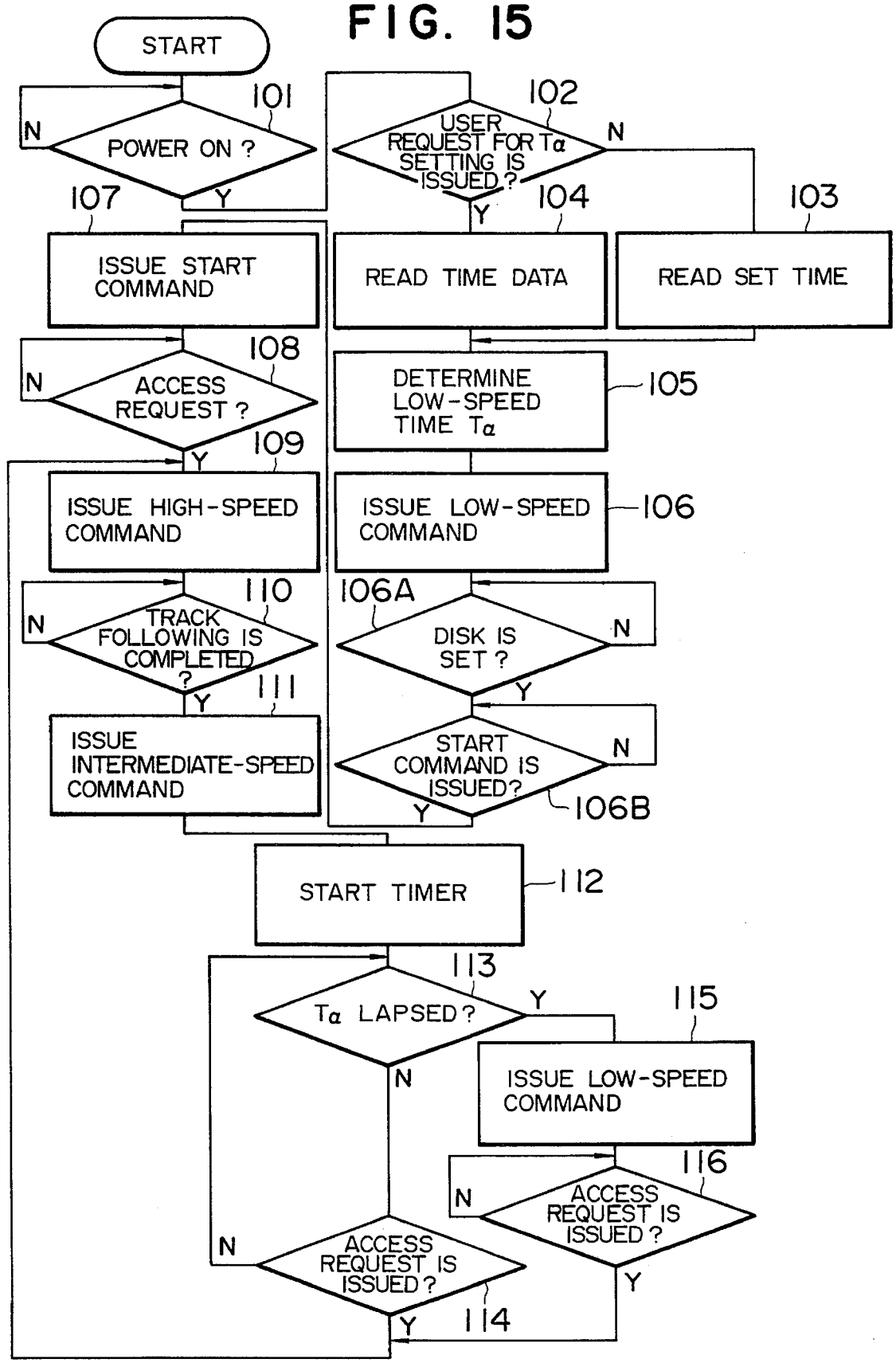
FIG. 15 is a flow chart for illustrating a variable-speed operation control of a spindle motor in the optical disk apparatus according to an embodiment of the invention.

Operation of the control apparatus will be described below by reference to a flow chart of FIG. 15. First, in a step 101, the power supply for the optical disk apparatus is turned on. In a step 102, decision is made as to whether a request is issued by the user for the value of timing Tα at which a low-speed command is to be outputted. Unless the request is issued, then a predetermined value is read out in a step 103, and otherwise data set previously is read out (step 104). In this manner, the timing Tα is determined (step 105), whereon the low-speed command is issued (step 106). Subsequently, setting or placing of an optical disk is waited for (step 106A). The optical disk apparatus is now set to the stand-by sate for awaiting a start command (step 106B). When an access request is issued to the signal processing unit 37 from the system controller 38 which is usually constituted by a microcomputer or the like, the signal processing unit 37 issues a start command 35A to the spindle motor control unit 35 (step 107), whereby operation of the spindle motor 6 is started. Subsequently, the signal processing unit 37 issues a laser emission command to the laser driving unit 31 while outputting control signals to the coarse actuator control unit 36, the focus control unit 32 and the tracking control units 33, respectively. When the access request is issued in the stand-by state (step 108), a high-speed command is first outputted (step 109), and data transfer is carried out when the high speed as commanded is reached, whereby the signal detected by the optical head 1 is amplified by the preamplifier 33 to be supplied to the signal processing unit 37. On the basis of this signal, the signal processing unit 37 sends out control signals to the focus control unit 32, the tracking control unit 33 and the coarse actuator control unit 36, respectively, for thereby realizing feedback controls by way of these units.

Upon disappearance of the access request signal from the system controller 38, decision is then made as to whether the track following operation has been completed or not. If so, an intermediate-speed command is issued (step 111) and at the same time a timer is activated (step 112). Subsequently, decision is made as to presence or absence of the access request (step 114). When no access request is found, the signal processing unit 37 issues a speed change command 35B to the spindle motor control unit 35 after lapse of the time Tα determined by the timer. In response to this speed-change command 35B, the spindle motor control unit 35 issues a low-speed command to the spindle motor 6 (step 115). Thereafter, issuance of a succeeding access request is awaited (step 116). When the access request is again issued, execution of the control procedure described above is repeated, starting from the high-speed command step 109.

Figure 16A:
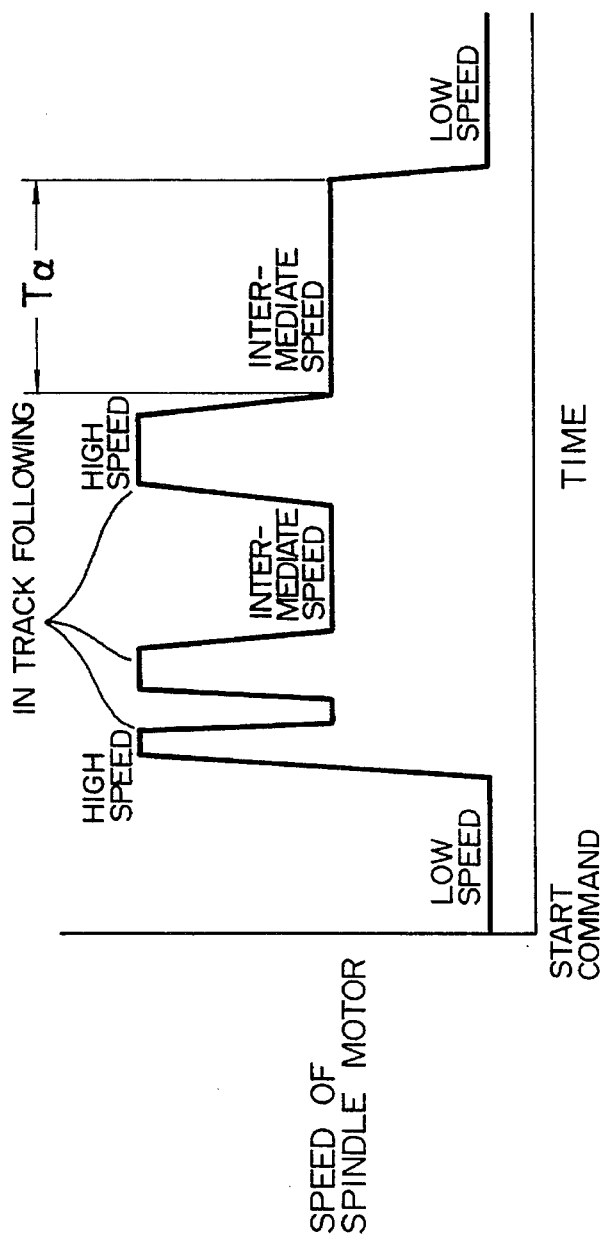
FIGS. 16A to 16C show waveform diagrams for illustrating a speed control of the spindle motor according to an embodiment of the invention.
Figure 16B:
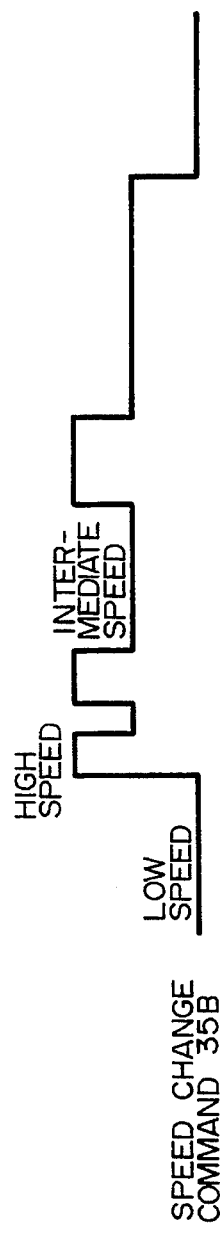
Figure 16C:

FIG. 16 shows waveforms for illustrating speed control of the spindle motor 6 according to an embodiment of the invention. As described preciously, the spindle motor 6 is changed over to a high speed operation every time a disk access request is issued. Since the rate of data transfer is previously determined, the spindle motor 6 is changed over to a high speed when the optical head 1 is in the track following mode and otherwise to an intermediate speed operation. In the latter case, control is performed for positioning stationarily the optical head 5 at a center between the inner and outer peripheries of the optical disk 1. To this end, a position command signal representing a half of the total number of the tracks on the optical disk 37 may be issued by the track control unit 33 to the coarse actuator control unit 36 via the signal processing unit 37 to thereby move the spindle motor 6 through the coarse actuator 7 until the difference between the current position and the command position indicated by the above-mentioned position command signal becomes zero, whereon the spindle motor is stationarily held at the command position. Further, upon lapse of the time Tα after the spindle motor 6 has been set to the intermediate-speed operation, the spindle motor 6 is changed over to the low-speed operation mode.

The reason for changing over the spindle motor to the low-speed mode without stopping it as described above may primarily be explained by the two facts mentioned below.

(1) Power consumption of the spindle motor 6 is very low in the low-speed running state of the motor.

(2) Because the spindle motor starting means is conventionally implemented in the form of a sensor-less circuit without using a magnetic pole position detector, a lot of time is taken for restarting the spindle motor, lowering the response performance of the optical disk apparatus.

The time duration Tα mentioned above can arbitrarily be determined by the user in consideration of application or environment in which the optical disk apparatus is used and in dependence on whether the user desires lower power consumption or short seek time.

Thus, according to the invention, it is taught to drive the spindle motor at a high speed only when the optical head is in the track following state and otherwise at low/intermediate speed with the aim of reducing the power consumption.

Further, positioning of the optical head at a center position between the inner and outer peripheries of the optical disk in the stand-by state provides an advantage that the seek time in the succeeding operation can be shortened.

As will now be understood from the foregoing description, in the optical disk apparatus in which the optical head assembly is stationarily disposed at a same side as the spindle motor for rotating the optical disk with reference to a surface of the optical disk according to an aspect of the present invention, the space existing between the optical disk and the base of the apparatus can effectively be utilized, whereby the optical disk apparatus as a whole can be realized in a thin structure. Besides, by disposing the optical system on the base (chassis) of the disk apparatus, rigidity of the platform for securing the optical head can be increased, whereby the vibration withstanding capability or vibration-proof property of the apparatus is enhanced.

Further, owing to the structure in which the stator of the spindle motor is disposed such that the center axis thereof is eccentrically deviated from that of the rotor and the optical head assembly is disposed at the side of the stator at a position where the distance between the center of the stator and the outer periphery thereof is minimum, the optical head can be moved to the innermost periphery of the recording area of the optical disk. Additionally, the optical disk apparatus can be implemented in a thin structure.

By using as the spindle motor a brushless motor whose rotor is constituted by a multi-pole permanent magnet or magnets magnetized such that magnetic poles of N- and S-polarities make appearance alternately in the circumferential direction and which can enjoy a high torque density, the spindle motor can be realized in a light weight structure. The optical disk apparatus in which the optical disk is held and moved together with such brushless motor relative to the stationary optical head assembly has a small inertial mass and thus exhibits a high-response characteristic.

In the optical disk apparatus according to another aspect of the invention in which the optical disk is held by making use of a part of magnetic flux produced by the permanent magnet or magnets constituting the rotor of the brushless motor serving as the spindle motor, any device dedicated for holding the optical disk is rendered unnecessarily, which contributes to a further reduction of weight of the disk apparatus.

By adopting as the coarse actuator for moving the spindle motor relative to the optical head assembly a linear motor having a movable member constituted by a multi-pole magnet or magnets, the thrust-volume ratio can be improved over the voice-coil motor used heretofore in the optical disk apparatus and at the same time thickness or height of the whole apparatus can further be reduced owing to a thin structure of the coarse actuator.

By providing a locking mechanism for mechanically preventing movement of the spindle motor when the optical disk apparatus is at rest, portability as well as vibration withstanding capability of the apparatus can be enhanced.

Additionally, owing to the speed control of the spindle motor such that the rotation speed thereof is lowered when the optical head is in the stand-by state and increased upon recording or reproducing operation (i.e., in the floating or track following state), low power consumption and low noise of the disk apparatus can be realized without sacrificing the data transfer rate, to a further advantage.

We claim:

1. An optical disk apparatus, comprising:

an optical disk for storing information, said disk having a disk substrate of a maximum diameter not greater than 3.5 inches;

a spindle motor for rotating said optical disk;

an optical head assembly including an optical head for performing at least one of information recording on said optical disk and information reproduction from said optical disk and a laser circuit for generating a light beam required for the recording and/or reproducing operation of said optical head; and a coarse actuator for moving said spindle motor in a diametrical direction of said optical disk;

wherein said optical head assembly is stationarily disposed on a base of the apparatus to oppose a same major disk surface as said spindle motor for rotating said optical disk with reference to a surface of said optical disk, and said spindle motor includes a rotor for rotating said optical disk and a stator for generating a torque for rotation of said rotor, and said stator is configured eccentrically relative to said rotor such that the center axis of said stator is deviated from that of said rotor, and said optical head assembly is disposed in juxtaposition to said stator at a location where a distance between the center axis of said stator and an outer periphery thereof is minimum, and said spindle motor is realized in the form of a brushless motor which includes a rotor constituted by a permanent magnet magnetized such that magnetic poles of N- and S-polarities make appearance alternately with one another in a circumferential direction of said rotor.

2. An optical disk apparatus according to claim 1, wherein said stator of said spindle motor has a minimum outer diameter which is smaller than a diameter of an innermost periphery of a recording area provided on said optical disk.

3. An optical disk apparatus according to claim 1, wherein the stator of said brushless motor includes a plurality of first magnetic pole cores each having a coil wound thereon for generating torque for rotation of said rotor, said first magnetic pole cores being disposed at and along a peripheral portion of said stator having a large diameter, said stator further including a plurality of second magnetic pole cores having no coil wound thereon and disposed at and along a peripheral portion of said stator having a small diameter;

said pluralities of first and second magnetic pole cores being magnetically coupled to one another by a stator core defining an outer periphery of said brushless motor.

4. An optical disk apparatus, comprising:

an optical disk for storing information, said disk having a disk substrate of a maximum diameter not greater than 3.5 inches;

an optical head assembly including an optical head for performing at least one of information recording on said optical disk and information reproduction from said optical disk and a laser circuit for generating a light beam required for the recording and/or reproducing operation of said optical head;

a spindle motor including a rotor for rotating said optical disk and a stator for generating a torque for rotation of said rotor, said stator being of a truncated circular shape wherein a truncated portion of said stator is for accommodating an approach of said stator to said optical head assembly and allowing access of said optical head assembly to inner diametrical portions of said optical disk; and a coarse actuator for moving said spindle motor in a diametrical direction of said optical disk such that said spindle motor can be caused to approach and move away from said optical head assembly;

wherein said optical head assembly is stationarily disposed on a base of the apparatus to oppose a same major disk information surface as said spindle motor for rotating said optical disk with reference to a surface of said optical disk.

* * * * *